United States Patent
Yang et al.

(10) Patent No.: US 9,231,674 B1
(45) Date of Patent: Jan. 5, 2016

(54) METHOD AND SYSTEM FOR CONSTRAINED POWER ALLOCATION IN THE MULTI-INPUT MULTI-OUTPUT SYSTEMS

(71) Applicant: Winbond Electronics Corp., Taichung (TW)

(72) Inventors: Chia-Hsiang Yang, Kinmen County (TW); Chiao-En Chen, Taichung (TW); Chun-Wei Chou, Yunlin County (TW)

(73) Assignee: WINBOND ELECTRONICS CORP., Taichung (TW)

( * ) Notice: Subject to any disclaimer, the term of this patent is extended or adjusted under 35 U.S.C. 154(b) by 0 days.

(21) Appl. No.: 14/626,730

(22) Filed: Feb. 19, 2015

(51) Int. Cl.
  *H03K 9/00* (2006.01)
  *H03D 1/06* (2006.01)
  *H04L 27/00* (2006.01)
  *H04B 7/04* (2006.01)

(52) U.S. Cl.
  CPC .................................. *H04B 7/0426* (2013.01)

(58) Field of Classification Search
  USPC ............... 375/219, 220, 222, 240.26–240.27, 375/259, 284, 285, 295, 316, 324, 347, 350, 375/354
  See application file for complete search history.

(56) References Cited

U.S. PATENT DOCUMENTS

| | | | | |
|---|---|---|---|---|
| 8,781,020 B1 * | 7/2014 | Lee | ...................... | H04B 7/0665 342/428 |
| 8,819,099 B2 * | 8/2014 | Sima | ................... | G06F 9/30014 708/200 |
| 2009/0310656 A1 * | 12/2009 | Maltsev | .................. | G06F 17/16 375/219 |
| 2012/0014415 A1 * | 1/2012 | Su et al. | ........................ | 375/140 |
| 2014/0301504 A1 * | 10/2014 | Chavali | ............... | H04B 7/0854 375/316 |

OTHER PUBLICATIONS

Yi Jiang et al., "The Generalized Triangular Decomposition," MathematiCS of Computation, Nov. 2006, pp. 1-22.*
Albert W. Marshall et al., "Inequalities: Theory of Majorization and Its Applications", Springer Series in Statistics, Second Edition, 923 pages, published in 2011.
Roger A. Horn et al., "Matrix Analysis" Cambridge University Pres, published in 1985, 8 pages.
Gene H. Golub et al., "Matrix Computations" Second Edition, The Johns Hopkins University Press, published in 1996, 10 pages.
Y. Jiang et al., "The geometric mean decompostion" Linear Algebra and its Applications, 396 (2005) pp. 373-384.
Jian-Kang Zhang et al., "Equal-Diagonal QR Decompostion and its Application to precoder Design for Successive-Cancellation Detection," IEEE Transactions on Information Theory, vol. 51, No. 1, Jan. 2005, pp. 154-172.

(Continued)

*Primary Examiner* — Linda Wong
(74) *Attorney, Agent, or Firm* — Muncy, Geissler, Olds & Lowe, P.C.

(57) ABSTRACT

A method for constrained power allocation in a multiple input multiple output (MIMO) system, including: executing a singular value decomposition (SVD) operation upon a channel matrix; obtaining a diagonal matrix, wherein the diagonal matrix is composed of a plurality of local matrixes; and transforming diagonal elements of the diagonal matrix into diagonal elements of a specific diagonal vector from an upper-left corner local matrix and a lower-right corner local matrix, in parallel, simultaneously, and according to a sequence, by using a generalized triangular decomposition.

12 Claims, 8 Drawing Sheets

(56) References Cited

OTHER PUBLICATIONS

Y. Jiang et al., "Joint Transceiver Design for MIMO Communications Using Geometric Mean Decomposition," IEEE Transactions on Signal Processing, vol. 53, No. 10, Oct. 2005, pp. 3791-3803.
Shaowei Lin et al., "Block Diagonal Geometric Mean Decomposition (BD-GMD) for MIMO Broadcast Channels," IEEE Transactions on Wireless Communications, vol. 7, No. 7, Jul. 2008, pp. 2778-2789.
Edward C. Y. Peh et al., "Power and Modulo Loss Tradeoff with Expanded Soft Demapper for LDPC Coded GMD-THP MIMO Systems," IEEE Transactions on Wireless Communications, vol. 8, No. 2, Feb. 2009, pp. 714-724.
Feng Liu et al., "Advanced Joint Transceiver Design for Block-Diagonal Geometric-Mean-Decomposition-Based Multiuser MIMO Systems," IEEE Transactions on Vehicular Technology, vol. 59, No. 2, Feb. 2010, pp. 692-703.
Chih-Hao Liu et al., "Generalized Geometric Mean Decomposition and DFE Transceiver Design—Part 1: Design and Complexity," IEEE Transactions on Signal Processing, vol. 60, No. 6, Jun. 2012, pp. 3112-3123.
Chih-Hao Liu et al., "Generalized Geometric Mean Decomposition and DFE Transceiver Design—Part II: Performance Analysis," IEEE Transactions on Signal Processing, vol. 60, No. 6, Jun. 2012, pp. 3124-3133.
M. Thomlinson, "New Automatic Equaliser Employing Modulo Arithmetic," Electronic Letters, Mar. 25, 1971, vol. 7, Nos. 5/6, pp. 138-139.
Hiroshi Harashima et al., "Matched-Transmission Technique for Channels with Intersymbol Interference," IEEE Transactions on Communications, vol. Com-20, No. 4, Aug. 1972, pp. 774-780.
Yi Jiang et al., "The Generalized Triangular Deocmposition," Mathematics of Computation, Nov. 2006, pp. 1-22.
Herman Weyl, "Inequalities Between the Two Kinds of Eigen Values of a Linear Transformation," The Institute for Advanced Study, Princeton, New Jersey, May 15, 1949, pp. 408-411.
Yi Jiang et al., "Transceiver Design Using Generalized Triangular Decomposition for MIMO Communications with QoS Constraints,", 2004, vol. 1, Conference Record of the Thirty-Eighth Asilomar Conference on Signals, Systems and Computers, Nov. 7-10, 2004, pp. 1154-1157.
Yi Jiang et al., "Tunable Channel Decomposition for MIMO Communications Using Channel State Information," IEEE Transactions on Signal Processing, vol. 54, No. 11, Nov. 2006, pp. 4405-4418.
Ching-Chih Weng et al., "MIMO Transceivers With Decision Feedback and Bit Loading: Theory and Optimization," IEEE Transactions on Signal Processing, vol. 58, No. 3, Mar. 2010, pp. 1334-1346.
Chih-Hao Liu et al., "Zero-Forcing DFE Transceiver Design Over Slowly Time-Varying MIMO Channels Using ST-GTD," IEEE Transactions on Signal Processing, vol. 58, No. 11, Nov. 2010, pp. 5779-5790.
Chih-Hao Liu et al., "MMSE DFE Transceiver Disign Over Slowly Time-Varying MIMO Channels Using ST-GTD," IEEE Transactions on Signal Processing, vol. 59, No. 1, Jan. 2011, pp. 277-289.
Wei-Da Chen et al., "A Constant Throughput Geometric Mean Decomposition Scheme Design for Wirless MIMO Precoding," IEEE Transactions on Vehicular Technology, vol. 62, No. 5, Jun. 2013, pp. 2080-2090.
Pramod K. Volder, "50 Years of CORDIC: Algorithms, Architectures, and Applications," IEEE Transactions on Circuits and Systems-1: Regular Papers, vol. 56, No. 9, Sep. 2009, pp. 1893-1907.
Jack E. Volder, "The CORDIC Trigonometric Computing Technique," IRE Transactions on Electric Computers, vol. EC-8, Issue:3, Published 1959, pp. 330-334.
J. S. Walther, "A unified algorithm for elementary functions," AFIPS '71 (Spring) Proceedings of the May 18-20, 1971, Spring Joint Computer Conference, pp. 379-385.
Joseph R. Cavalloro et al., "CORDIC Arithmetic for an SVD Processor," Journal of Parallel and Distributed Computing, 5, 271-290 (1988).
A. Ahmedsaid et al., "Improved SVD systolic array and implementation of FPGA," Proceedings of IEEE International Conference on Field-Programmable Technology (FPT), 2003, pp. 35-42.
Yin-Tsung Hwang et al., "A Low Complexity Geometric Mean Decomposition Computing Scheme and Its High Throughput VLSI Implementation," IEEE Transactions on Circuits and Systems-1: Regular Papers, vol. 61, No. 4, Apr. 2014, pp. 1170-1182.
Wen-Chih Kan et al., "MIMO Transceiver Design Based on a Modified Geometric Mean Decomposition," IEEE International Symposium on Circuits and Systems, 2007, pp. 677-680.
Chiao-En Chen et al., "An Iterative Geometric Mean Decomposition Algorithm for MIMO Communications Systems," IEEE Transactions on Wirless Communications, vol. 14, Issue 1, 2015, pp. 343-352.
Richard P. Brent et al., "Computation of the Singular Value Decomposition Using Mesh-Connected Processors," Journal of VLSI and Computer Systems, vol. 1, No. 3, pp. 242-270, 1983.
Nariankadu D. Hemkumar et al., "A Systolic VLSI Architecture for Complex SVD," IEEE International Symposium on Circuits and Systems, vol. 3, 1992, pp. 1061-1064.
Richard P. Brent et al., "The Solution of Singular-Value and Symmetric Eigenvalue Problems on Multiprocessor Arrays," SIAM J. Sci. Stat. Comput., vol. 6, No. 1, Jan. 1985, pp. 69-84.
IEEE Standard for Information technology—Telecommunications and information exchange between systems Local and metropolitan area networks—specific requirements, Part 11: Wirless LAN Medium Access Control (MAC) and Physical Layer (PHY) Specifications, published on Dec. 11, 2013, IEEE Standards Association, 425 pages.
Chia-Shen Hsu, "Geometric Mean Decomposition Aided Tomlinson-Harashima Precoding for Iterative MIMO Systems," Institute of Communications Engineering, College of Engineering, National Chung Cheng University, published in Jul. 2013.
Dejan Marković et al., "Power and Area Minimization for Multidimensional Signal Processing," IEEE Journal of Solid-State Circuits, vol. 42, No. 4, Apr. 2007, pp. 922-934.
Yen-Liang Chen et al., "Reconfigurable Adaptive Singular Value Decomposition Engine Design for High-Throughput MIMO-OFDM Systems," IEEE Transactions on Very Large Scale Integration (VLSI) Systems, vol. 21, No. 4, Apr. 2013, pp. 747-760.

\* cited by examiner

METHOD AND SYSTEM FOR CONSTRAINED POWER ALLOCATION IN THE MULTI-INPUT MULTI-OUTPUT SYSTEMS

BACKGROUND OF THE INVENTION

1. Field of the Invention

Aspects of the present invention relate generally to wireless communication networks and, more particularly, to a method and a device for constrained power allocation in a multiple input multiple output (MIMO) system.

2. Description of the Related Art

Communications over multiple-input-multiple-output (MIMO) channels has been the subject of intense research in recent years and has emerged as one of the most significant breakthroughs in modern communications. Communications over MIMO channels can support significantly higher data rates and greater reliability relative to communications using single-input-single-output (SISO) channels. MIMO-based communications may help to resolve the bottleneck problem limiting traffic capacity in future Internet-intensive wireless networks, for example. Many researchers also believe that MIMO-based technology is poised to penetrate large-scale, standards-driven commercial wireless products and networks such as broadband wireless access systems, wireless local area networks (WLAN), and third-generation (3G) as well as fourth-generation (4G) networks.

An essential feature of a MIMO communications system is that, by appropriately coding signals transmitted from multiple transmitting antennas to multiple receiving antennas, the system is able to turn multipath-propagation—long a problem in wireless communications—into an advantage. MIMO communications systems take advantage of random channel fading and, when possible, multipath delay spread to increase channel capacity. This is accomplished by combining at a receiver the signals transmitted from multiple transmitting antennas to multiple receiving antennas so as to increase quality in terms of the bit-error rate (BER) or the data rate (bits per second). The prospect of improvements of orders of magnitude relative to more conventional communications systems is one reason for the increased interest in MIMO-based technologies.

With respect to transceivers, most research to date has focused on linear transceiver designs. According to conventional linear transceiver designs, a channel matrix that models the characteristics of a transmission channel is diagonalized using the known technique of singular value decomposition (SVD) in order to maximize channel throughput. This conventional approach, however, can add considerable complexity to the modulation-demodulation and coding-decoding procedures needed to successfully convey signals over multiple subchannels resulting from the SVD.

Therefore, the generalized triangular decomposition (GTD) is proposed to provide the transmitters for transmitting data according to the specified constraints to improve transmission performance. However, the current GTD requires a more complicated operation and has a limited speed of computation. Using hardware directly to achieve the above method will cost a lot. Therefore, there is a need for a novel method and a device that can not only reduce the complexity and the cost, but also be rapidly implemented in the hardware.

BRIEF SUMMARY OF THE INVENTION

A detailed description is given in the following embodiments with reference to the accompanying drawings.

A method and a device for constrained power allocation in a multiple input multiple output (MIMO) system are provided.

In a preferred embodiment, the invention is directed to a method for constrained power allocation in a multiple input multiple output (MIMO) system, comprising: executing a singular value decomposition (SVD) operation upon a channel matrix and obtaining a diagonal matrix, wherein the diagonal matrix is composed of a plurality of local matrixes; and transforming diagonal elements of the diagonal matrix into diagonal elements of a specific diagonal vector from an upper-left corner local matrix and a lower-right corner local matrix, in parallel, simultaneously, and according to a sequence, by using a generalized triangular decomposition.

In some embodiments of the method, the SVD operation and the generalized triangular decomposition are implemented by using at least a coordinate rotation digital computer (CORDIC) operation. In some embodiments of the method, the method further comprises transforming respective diagonal local matrixes into an upper triangular matrix from the upper-left corner local matrix and the lower-right corner local matrix in parallel by using a vectoring mode of the CORDIC operation. In some embodiments of the method, the step of transforming diagonal elements of the diagonal matrix into diagonal elements of a specific diagonal vector further comprises: transforming remaining diagonal local matrixes into the upper triangular matrix from the upper-left corner local matrix according to a upper-left to lower-right sequence; and transforming remaining diagonal local matrixes into the upper triangular matrix from the lower-right corner local matrix according to a lower-right to upper-left sequence; wherein the steps of transforming the diagonal local matrixes are executed in parallel until the diagonal elements of the diagonal local matrix are transformed into the diagonal elements of the specific diagonal vector. In some embodiments of the method, a product of each of the absolute values of the diagonal elements of the specific diagonal vector is equal to a product of the absolute values of the diagonal elements of the diagonal matrix. In some embodiments of the method, the local matrix is a 2×2 matrix.

In a preferred embodiment, the invention is directed to a communication device for constrained power allocation in a multiple input multiple output (MIMO) system. The communication device comprises a programmable coordinate rotation digital computer (CORDIC) circuit, wherein the CORDIC circuit further comprises at least one CORDIC element. The CORDIC element executes a singular value decomposition (SVD) operation upon a channel matrix and obtaining a diagonal matrix, wherein the diagonal matrix is composed of a plurality of local matrixes. The CORDIC element further transforms diagonal elements of the diagonal matrix into diagonal elements of a specific diagonal vector from an upper-left corner local matrix and a lower-right corner local matrix, in parallel, simultaneously, and according to a sequence, by using a generalized triangular decomposition.

In some embodiments of the communication device, the CORDIC element uses at least a CORDIC operation to implement the SVD operation and the generalized triangular decomposition. In some embodiments of the communication device, the CORDIC element transforms respective diagonal local matrixes into an upper triangular matrix from the upper-left corner local matrix and the lower-right corner local matrix in parallel by using a vectoring mode of the CORDIC operation. In some embodiments of the communication device, the step of transforming diagonal elements of the diagonal matrix into diagonal elements of a specific diagonal vector further comprises: the CORDIC element transforms remaining diagonal local matrixes into the upper triangular matrix from the upper-left corner local matrix according to a upper-left to lower-right sequence; and the CORDIC element transforms remaining diagonal local matrixes into the upper triangular matrix from the lower-right corner local matrix according to a lower-right to upper-left sequence; wherein the steps of transforming the diagonal local matrixes are executed in parallel until the diagonal elements of the diagonal local matrix are transformed to the diagonal elements of the specific diagonal vector. In some embodiments of the communication device, a product of each of the absolute values of the diagonal elements of the specific diagonal vector is equal to a product of the absolute values of the diagonal elements of the diagonal matrix. In some embodiments of the communication device, the local matrix is a 2×2 matrix.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Several exemplary embodiments of the present disclosure are described with reference to FIGS. 1 through 8, which generally relate to a method and a device for constrained power allocation in a multiple input multiple output (MIMO) system. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

As described herein, the uniform channel decomposition scheme can be implemented in different forms. The invention also can be applied to a variety of communication protocols.

Although described herein primarily in the context of wireless communications systems, it will be readily apparent to one of ordinary skill in the art, that the invention can be applied to other communications systems and devices as well. The systems include voice and data systems such as those utilizing digital telecommunications protocols and those utilizing digital subscriber lines (DSL). The devices with which the invention can be implemented include, for example, cellular phones, personal digital assistants (PDA), and computing devices such as laptop computers.

Figure 1:
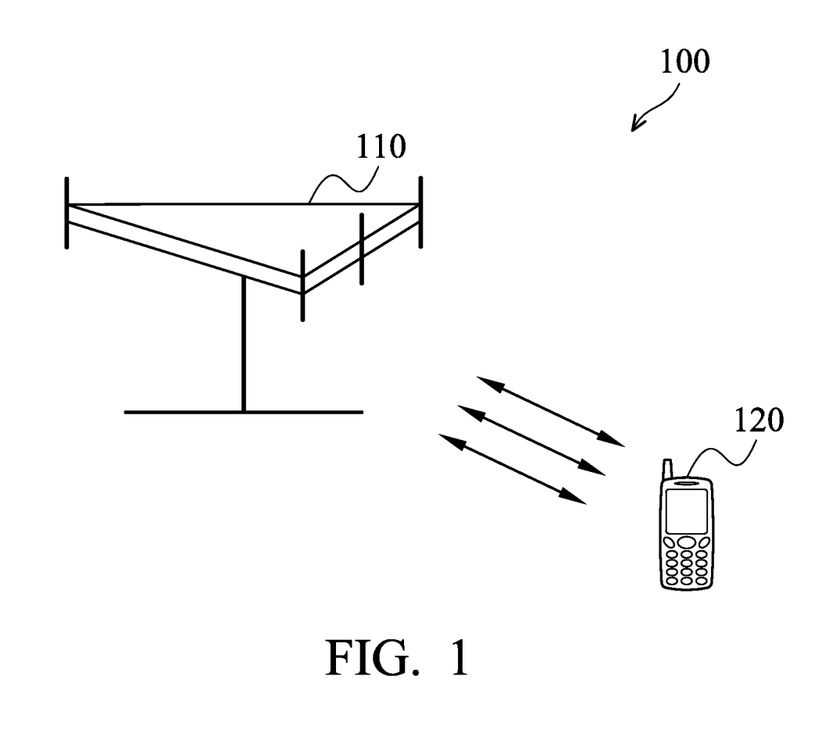
FIG. 1 is a schematic simplified diagram illustrating the system performing MIMO collaborative communication according to an embodiment of the invention.

FIG. 1 is a schematic simplified diagram 100 illustrating the system performing MIMO collaborative communication according to an embodiment of the invention. Although for the sake of simplicity in description, the MIMO collaborative communication system in FIG. 1 is only shown to include a base station 110 and one user equipment (UE) 120, wherein the base station 110 includes three transmission antennas, and the UE 120 has two receiving antennas. It should be noted that the detailed configuration parameters of the system shall not be used to restrict the invention. That is to say, the MIMO collaborative communication system according to the embodiment of the invention may include more than one UE and more than one base station collaboratively communicating with the UEs, wherein the number of antennas that can be installed in each base station and UE is not limited to 3 and 2 shown in FIG. 1 and can be any number according to practical condition of the system.

Figure 2:
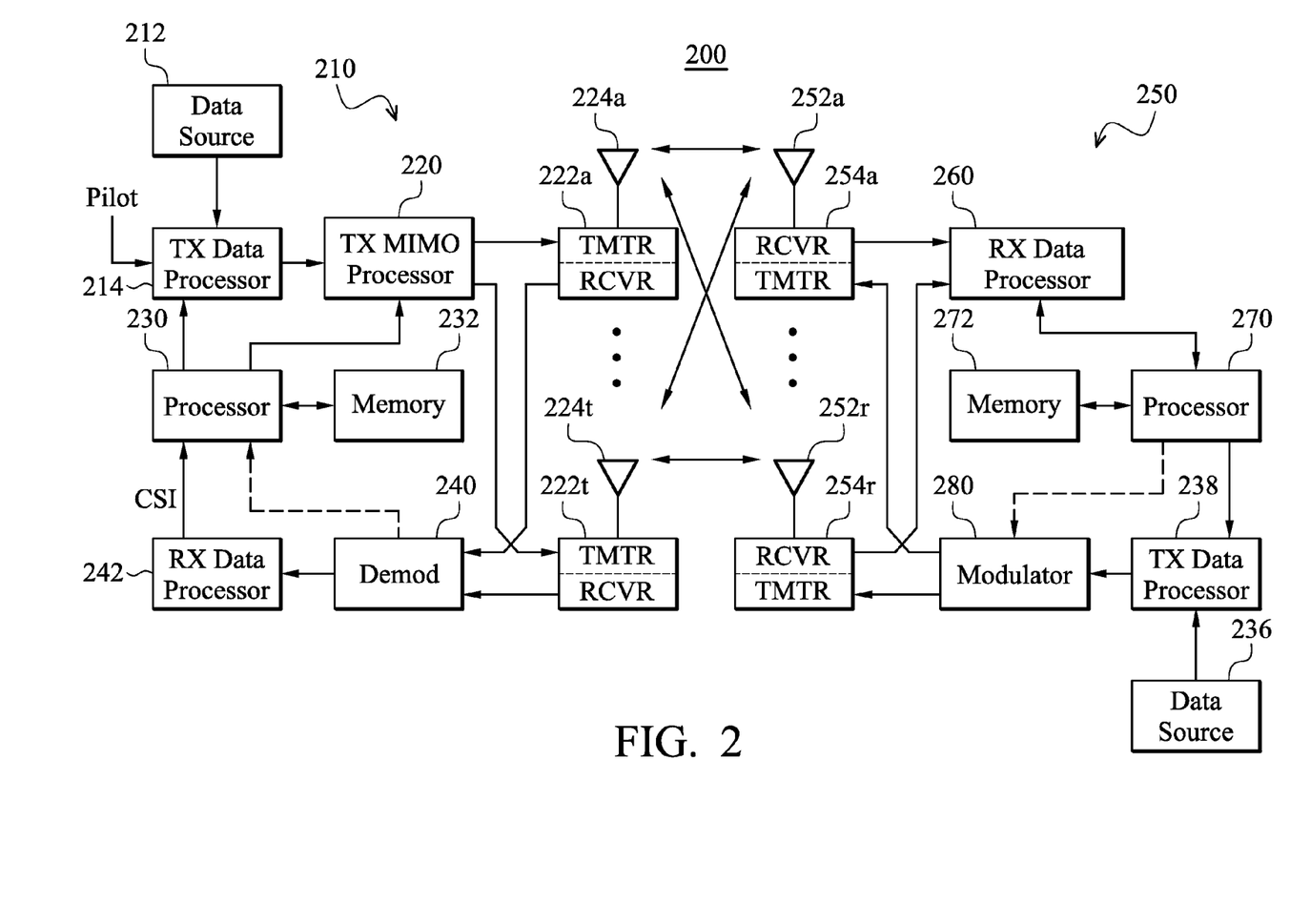
FIG. 2 is a block diagram of an embodiment of a transmitter system (also known as the base station) and a receiver system (also known as the UE) in a MIMO system.

FIG. 2 is a block diagram of an embodiment of a transmitter system 210 (also known as the base station) and a receiver system 250 (also known as the UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and processes the samples further to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224a through 224t, conditioned by receivers 222a through 222t, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In a MIMO-based system, a wireless channel may be characterized using an N×M channel matrix H having a rank K, wherein N is the number of receiving antennas and M is the number of transmitting antennas. Using SVD, the channel matrix H may be assumed to be in the form:

$$H=U\Sigma V^H,$$

wherein U and V are unitary matrixes, and $\Sigma$ is a diagonal matrix. A diagonal vector of $\Sigma$ is $$\sigma=[\sigma_1,\ldots,\sigma_K]^T \text{ and } \sigma_1 \geq \ldots \geq \sigma_K.$$

In order to improve the speed of computation, a parallel GTD algorithm method is proposed in the invention. The method uses two computing cores to execute the GTD algorithm in parallel, and computes the GTD algorithm through simple CORDICs. In one embodiment, the general function of the CORDIC executed in the invention may be expressed as follows:

$$X_{n+1}=X_n-m\cdot d_n\cdot Y_n\cdot 2^{-n}$$

$$Y_{n+1}=Y_n+d_n\cdot X_n\cdot 2^{-n}$$

$$Z_{n+1}=Z_n+d_n\cdot \tan^{-1}(n),$$

wherein m is a coordinate system function and is used to control the CORDIC for coordinate systems, and d is rotation information and is used to indicate a direction and an angle of rotation.

Figure 3:
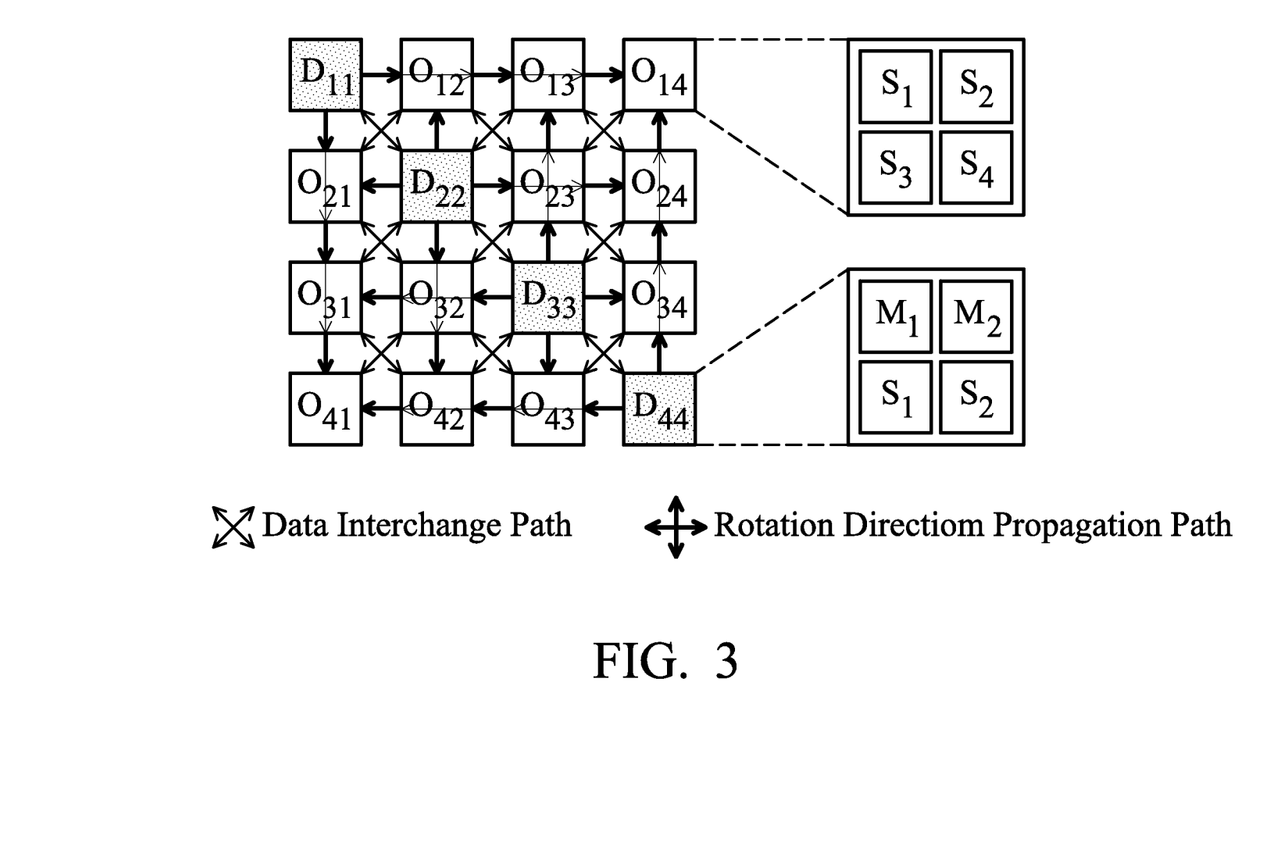
FIG. 3 is a schematic diagram illustrating hardware architecture of systolic arrays designed by using CORDICs as cores and the direction that the signal is passed through according to an embodiment of the present invention.

FIG. 3 is a schematic diagram illustrating hardware architecture of systolic arrays designed by using CORDICs as cores, and the direction that the signal is passed through according to an embodiment of the present invention. In FIG. 3, $D_{}$ represents diagonal cores, i.e., cores positioned on the diagonal line. $O_{}$ represents off-diagonal cores, i.e., cores not positioned on the diagonal line. Each core computes a 2×2 local matrix, therefore a 4×4 systolic array can support up to an 8×8 matrix. A diagonal core is composed of 2 master CORDICs ($M_1 \sim M_2$ in FIG. 3) and 2 slave CORDICs ($S_1 \sim S_2$ in FIG. 3), while an off-diagonal core is composed of 4 slave CORDICs ($S_1 \sim S_4$ in FIG. 3). The master CORDICs calculate the required rotation information $d_n$ and transmit the rotation information $d_n$ to the off-diagonal cores in the same column (row); according to the rotation information $d_n$, the slave CORDICs in the diagonal and off-diagonal cores in the same column (row) rotate accordingly.

Figure 4:
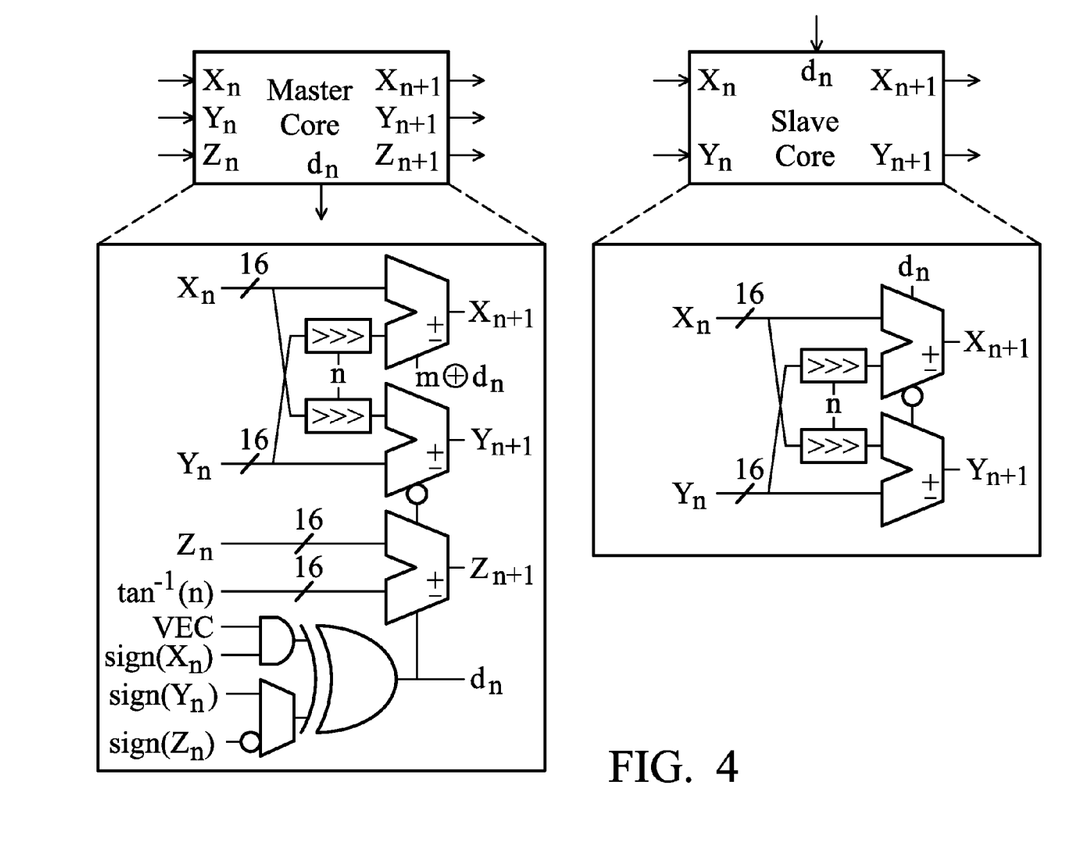
FIG. 4 is a schematic diagram illustrating hardware design of a master CORDIC core and a slave CORDIC core according to another embodiment of the present invention.

FIG. 4 is a schematic diagram illustrating hardware design of a master CORDIC core and a slave CORDIC core according to another embodiment of the present invention. In the master core, the CORDIC can be controlled to switch between a rotation mode and a vectoring mode by setting the control signal VEC, and the coordinate function m is used to switch between different coordinate function systems (circle, linear, hyperbolic). In the embodiment, the master CORDIC core can switch between the two modes of operation by setting the control signal VEC and the coordinate function m. The first mode of operation is a "circular-rotation" mode, used to obtain the rotation information for eliminating specific elements after the operations for Xn, Yn, and Zn. The second mode of operation is "hyperbolic-vectoring" mode, used to compute the function $\sqrt{X^2-Y^2}$ for GTD. The slave core is composed of two shifters and two add-subtracters, and is used to rotate the input vector (X, Y) according to the rotation information $d_n$ transmitted from the master core. In another embodiment of the invention, a 1-bit XOR (not shown in FIG. 4) can be added for the control adder/subtracters to implement the step of switching the different coordinate system functions m.

After executing the SVD operation on the channel matrix H, a generalized triangular decomposition is executed. A user-specified vector $r=[r_1, \ldots, r_K]^T$ is given in the generalized triangular decomposition. The user-specified vector needs to conform to Weyl's multiplicative majorization condition, which can be written as follows:

$$\prod_{i=1}^{K-1}|r_i| \leq \prod_{i=1}^{K-1}|\sigma_i|, \text{ and } \prod_{i=1}^{K}|r_i| = \prod_{i=1}^{K}|\sigma_i|.$$

Therefore, the channel matrix H would be as follows:

$$H=QRP^H,$$

wherein Q and P are unitary matrixes, and R is an upper-triangular matrix with the diagonal vector r.

In order to calculate the upper-triangular matrix R quickly, two hardware cores used in the present invention calculate two local matrixes in parallel and simultaneously, and transform two elements of the diagonal elements into the user-specified elements. The transformation mode is separated into two modes. One mode, called "Top-down mode", is to execute the generalized triangular decomposition from the upper-left corner local matrix. Another mode, called "Bottom-up mode", is to execute the generalized triangular decomposition from the lower-right corner local matrix.

The Top-down GTD can be written as follows:

$$\frac{1}{r_k}\begin{bmatrix} c\delta_1 & s\delta_2 \\ -s\delta_2 & c\delta_1 \end{bmatrix}\begin{bmatrix} \delta_1 & 0 \\ 0 & \delta_2 \end{bmatrix}\begin{bmatrix} c & -s \\ s & c \end{bmatrix} = \begin{bmatrix} r_k & x \\ 0 & y \end{bmatrix} \qquad (1)$$

wherein c=cos θ, s=sin θ, $$\text{and } \theta = \tan^{-1}\sqrt{\frac{\delta_1^2 - r_k^2}{r_k^2 - \delta_2^2}}.$$

The Bottom-up GTD can be written as follows:

$$\begin{bmatrix} c & s \\ -s & c \end{bmatrix}\begin{bmatrix} \delta_1 & 0 \\ 0 & \delta_2 \end{bmatrix}\begin{bmatrix} c\delta_2 & -s\delta_1 \\ s\delta_1 & c\delta_2 \end{bmatrix}\frac{1}{r_k} = \begin{bmatrix} y & x \\ 0 & r_k \end{bmatrix} \qquad (2)$$

wherein c=cos θ, s=sin θ, $$\text{and } \theta = \tan^{-1}\sqrt{\frac{r_k^2 - \delta_2^2}{\delta_1^2 - r_k^2}}.$$

Using the Top-down GTD as an example, the CORDIC can be used to rotate the local matrix by specific degrees, wherein the formula (1) would become as follows:

$$\frac{1}{r_k}\begin{bmatrix} c\delta_1 & s\delta_2 \\ -s\delta_2 & c\delta_1 \end{bmatrix}\begin{bmatrix} c\delta_1 & -s\delta_1 \\ s\delta_2 & c\delta_2 \end{bmatrix} = \begin{bmatrix} r_k & x \\ 0 & y \end{bmatrix}.$$

Next, the vectoring mode of the CORDIC operation can be used to transform the lower-right corner element into 0, and transform the upper left corner element into $r_k$.

Figure 5:
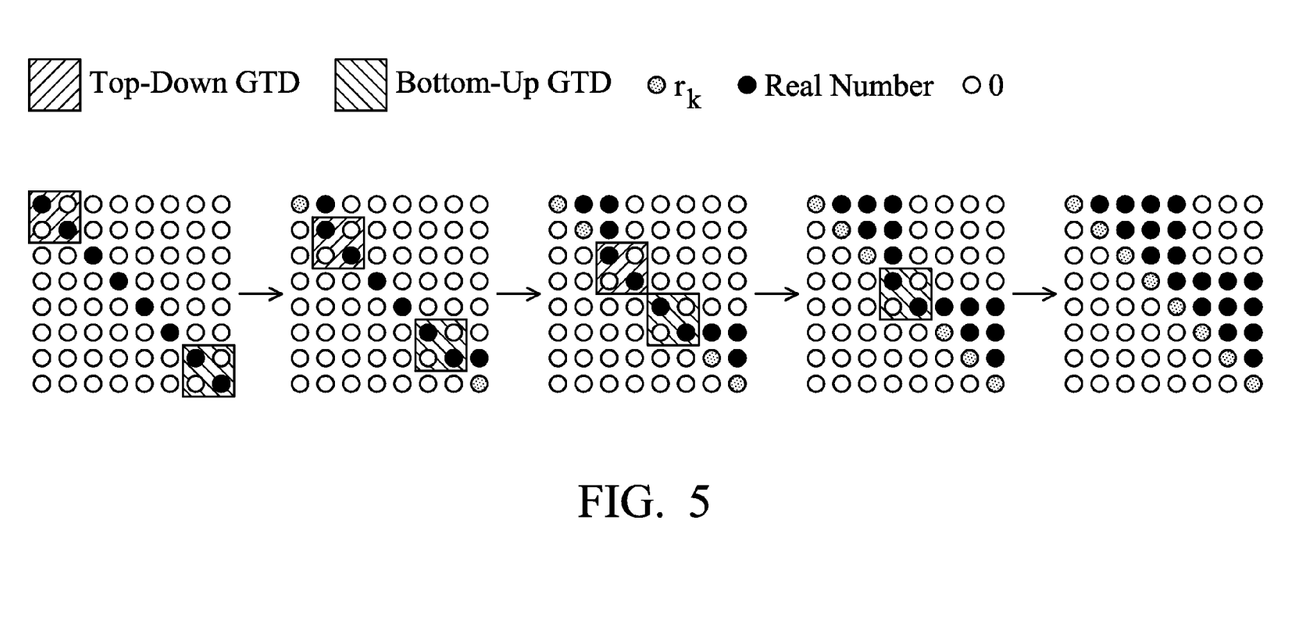
FIG. 5 is a schematic diagram illustrating the movement required for transforming the diagonal elements according to an embodiment of the present invention.

FIG. 5 is a schematic diagram illustrating the movement required for transforming the diagonal elements according to an embodiment of the present invention. An 8×8 matrix is used as an example. As shown in FIG. 5, the Top-down GTD and the Bottom-up GTD are executed from the upper-left matrix and the lower-right matrix. After obtaining the diagonal elements $r_1$ and $r_8$, the Top-down GTD is executed to transform remaining diagonal local matrixes into the upper triangular matrix according to a upper-left to lower-right sequence, and the Bottom-up GTD is executed to transform remaining diagonal local matrixes into the upper triangular matrix according to a lower-right to upper-left sequence. In the example, the steps of transforming the diagonal local matrixes for the Top-down GTD and the Bottom-up GTD are executed in parallel until the diagonal elements of the diagonal local matrix are transformed into the diagonal elements of the specific diagonal vector.

Figure 6:
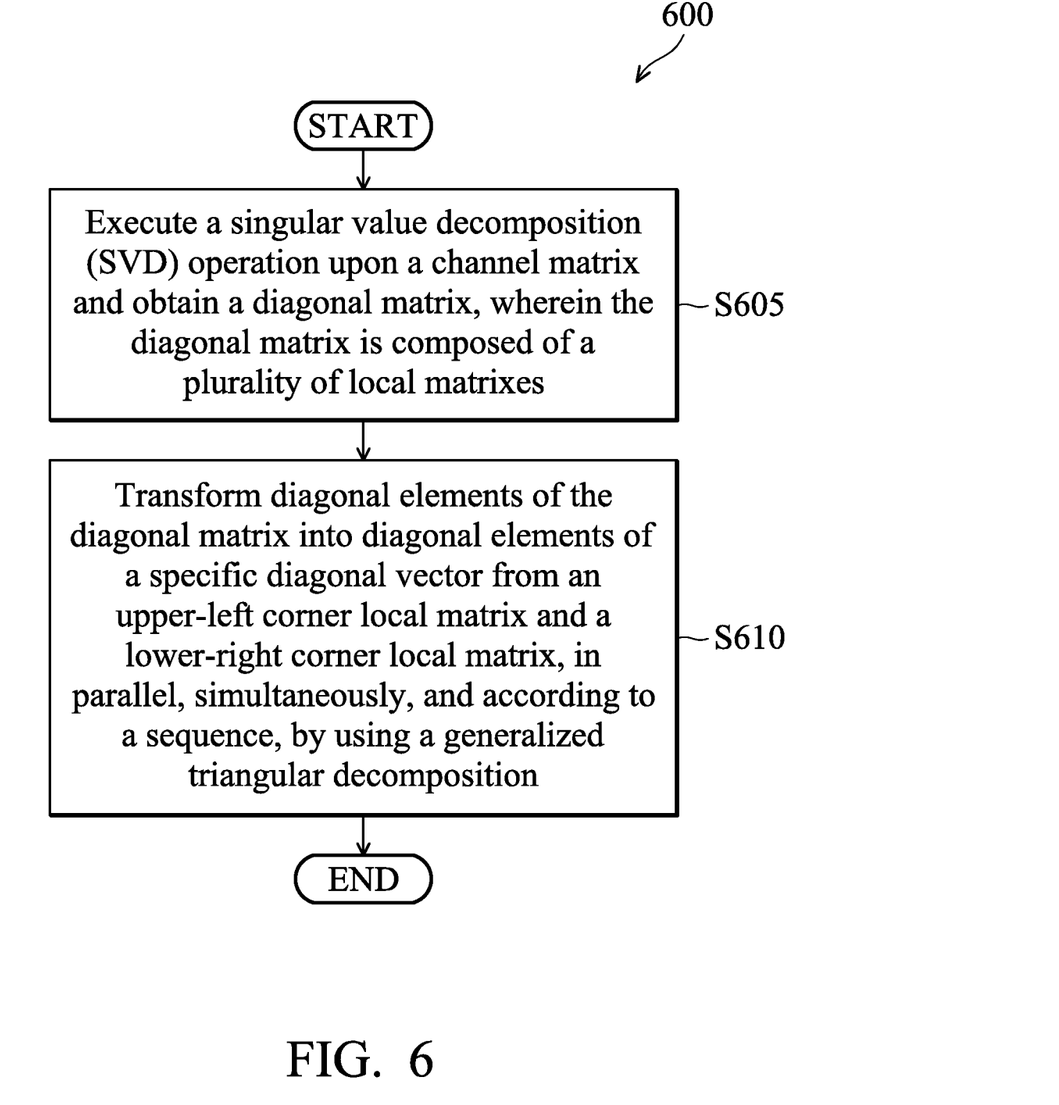
FIG. 6 illustrates a flow chart of a method for constrained power allocation in a multiple input multiple output (MIMO) system according to an embodiment of the invention.

FIG. 6 illustrates a flow chart 600 of a method for constrained power allocation in a multiple input multiple output (MIMO) system according to an embodiment of the invention. In step S605, a singular value decomposition (SVD) operation upon a channel matrix is executed and a diagonal matrix is obtained, wherein the diagonal matrix is composed of a plurality of local matrixes. In step S610, diagonal elements of the diagonal matrix is transformed into diagonal elements of a specific diagonal vector from an upper-left corner local matrix and a lower-right corner local matrix, in parallel, simultaneously, and according to a sequence, by using a generalized triangular decomposition.

In another embodiment, the device 300 may comprise a programmable CORDIC circuit, wherein the programmable CORDIC circuit may comprise at least one CORDIC element to perform the actions and steps in the embodiments described above.

Figure 7:
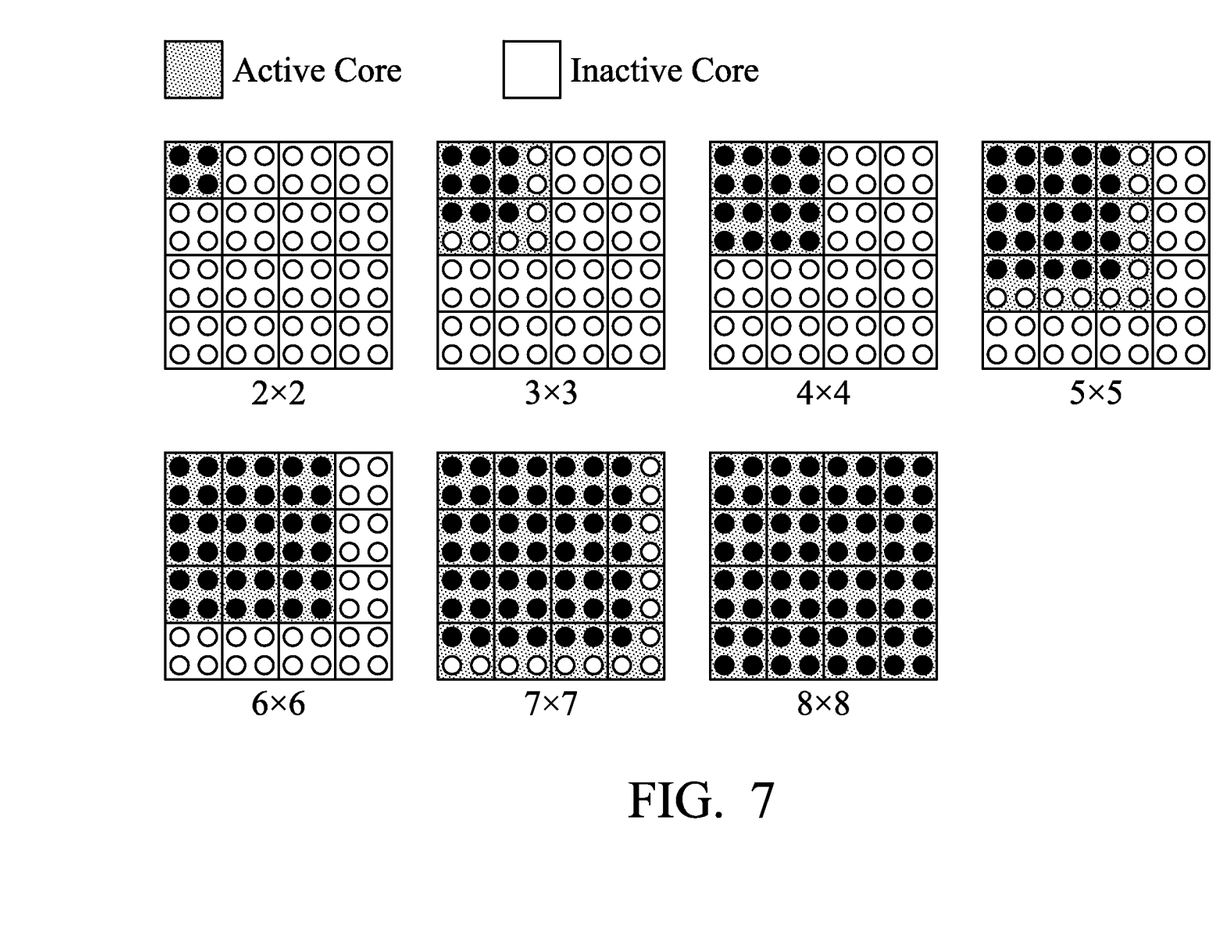
FIG. 7 a schematic diagram illustrating hardware core architectures for matrixes of different sizes according to an embodiment of the present invention.

In one embodiment, an approach for supporting the matrix with a small dimension is to use an instruction set as a control core of the communication device, and combine a clock-gating stopping register to achieve the approach. When computing the matrix with the small dimension, such as 6×6 matrix, the mode of operation (SVD or GTD) and the size of the matrix need to be inputted before inputting matrix signals. After receiving the signals, the control core may execute control steps corresponding to the signals, and use commands to stop the diagonal cores $D_{14}$, $D_{24}$, $D_{34}$, $D_{44}$, $D_{41}$, $D_{42}$, $D_{43}$, and stop registers in the control core by using a clock gate to save power consumption. As shown in FIG. 7, gray squares represent active cores, white squares represent inactive cores, black dots represent arbitrary numbers, and white dots are set to zeros. As shown above, the CORDIC operations needed in the embodiment are a circular coordinate vectoring mode, a hyperbolic coordinate vectoring mode and a circular coordinate rotation mode. Therefore, a CORDIC circuit having only the needed functions can save more space in the device.

Figure 8:
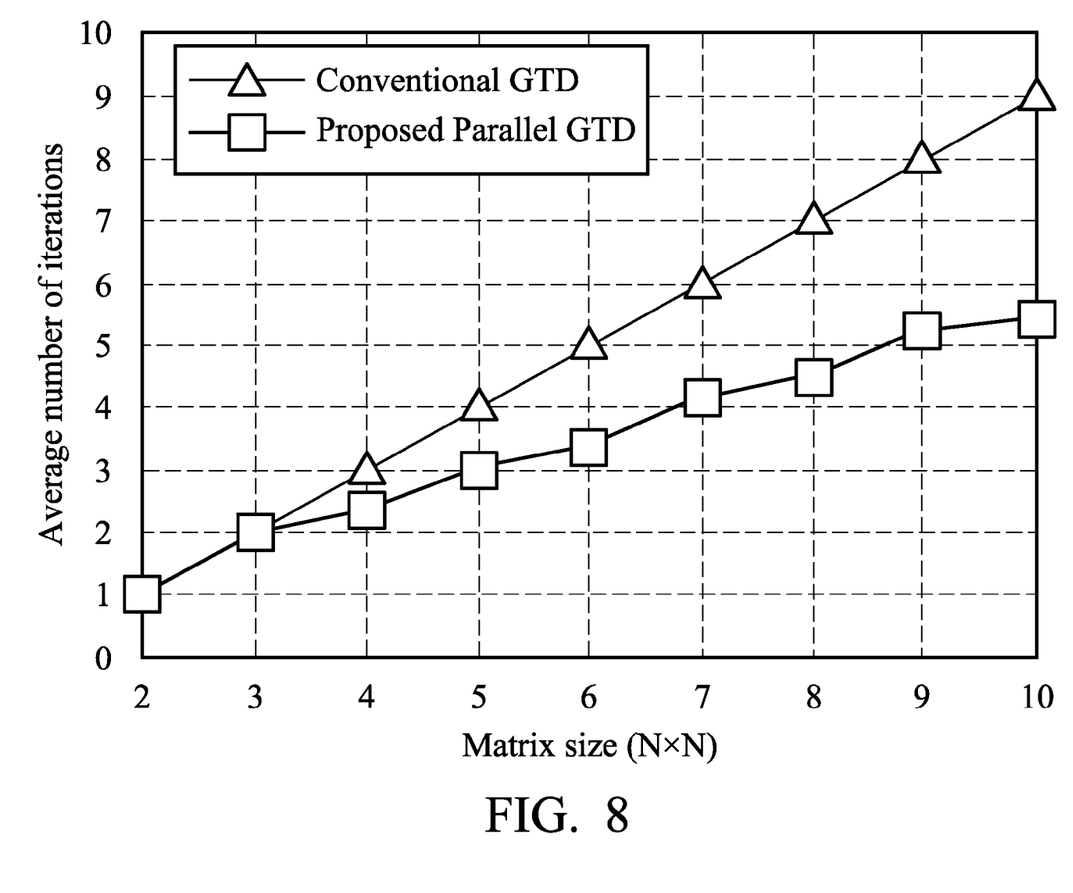
FIG. 8 is a comparison chart according to an embodiment of the invention.

FIG. 8 is a comparison chart according to an embodiment of the invention. As shown in FIG. 8, since the generalized triangular decomposition algorithm comprises many multiplication and division calculations, it is very difficult to implement the generalized triangular decomposition algorithm through traditional hardware due to extremely high complexity. If using the traditional hardware to implement the generalized triangular decomposition algorithm without any improvement, the processing speed is very slow. If using the specific hardware in the present invention to solve the generalized triangular decomposition algorithm, it can improve the processing speed which is much higher than the processing speed of using the traditional hardware. For example, the proposed method yields a 1.66 speedup for an 8×8 matrix. The processing speed roughly doubles when the matrix size approaches infinity. In addition, it can improve up to four-times higher processing speed by using the hardware core proposed in the invention than the processing speed of the conventional hardware core.

As described above, a method and a device for constrained power allocation in a multiple input multiple output (MIMO) system can compute two local matrixes in parallel and simultaneously. In addition, all operations (singular value decomposition and generalized triangular decomposition operation) in the present invention can be implemented via at least one CORDIC circuit to not only reduce large and complicated operations, such as multiplication and/or division, but also save many hardware resources to achieve the purpose of saving power consumption.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method to constrain power allocation in a multiple input multiple output (MIMO) system, used in a communication device comprising
a programmable coordinate rotation digital computer (CORDIC) circuit comprising:
executing, by the programmable CORDIC circuit, a singular value decomposition (SVD) operation upon a channel matrix and obtaining a diagonal matrix, wherein the diagonal matrix is composed of a plurality of local matrixes; and
transforming, by the programmable CORDIC circuit, diagonal elements of the diagonal matrix into diagonal elements of a specific diagonal vector from an upper-left corner local matrix and a lower-right corner local matrix, in parallel, simultaneously, and according to a sequence, by using a generalized triangular decomposition, to reduce a dimension of the channel matrix which reduces power consumption of the CORDIC circuit,
wherein the transforming of the diagonal elements of the diagonal matrix into diagonal elements of the specific diagonal vector further comprises:
transforming remaining diagonal local matrixes into the upper triangular matrix from the upper-left corner local matrix according to a upper-left to lower-right sequence; and
transforming remaining diagonal local matrixes into the upper triangular matrix from the lower-right corner local matrix according to a lower-right to upper-left sequence.

2. The method to constrain power allocation as claimed in claim 1, wherein the SVD operation and the generalized triangular decomposition are implemented by using at least a coordinate rotation digital computer (CORDIC) operation.

3. The method to constrain power allocation as claimed in claim 2, further comprising: transforming, by the programmable CORDIC circuit, respective diagonal local matrixes into an upper triangular matrix from the upper-left corner local matrix and the lower-right corner local matrix in parallel by using a vectoring mode of the CORDIC operation.

4. The method to constrain power allocation as claimed in claim 1, wherein the transforming of the remaining diagonal local matrixes are executed in parallel until the diagonal elements of the diagonal local matrix are transformed into the diagonal elements of the specific diagonal vector.

5. The method to constrain power allocation as claimed in claim 1, wherein a product of each of the absolute values of the diagonal elements of the specific diagonal vector is equal to a product of the absolute values of the diagonal elements of the diagonal matrix.

6. The method to constrain power allocation as claimed in claim 1, wherein each of the local matrixes is a 2×2 matrix.

7. A communication device to constrain power allocation in a multiple input multiple output (MIMO) system, comprising:
a programmable coordinate rotation digital computer (CORDIC) circuit, further comprising:
at least one CORDIC element, executing a singular value decomposition (SVD) operation upon a channel matrix and obtaining a diagonal matrix, wherein the diagonal matrix is composed of a plurality of local matrixes; and
transforming diagonal elements of the diagonal matrix into diagonal elements of a specific diagonal vector from an upper-left corner local matrix and a lower-right corner local matrix, in parallel, simultaneously, and according to a sequence, by using a generalized triangular decomposition, to reduce a dimension of the channel matrix which reduces power consumption of the CORDIC circuit,
wherein the transforming of the diagonal elements of the diagonal matrix into diagonal elements of the specific diagonal vector further comprises:
the at least one CORDIC element transforms remaining diagonal local matrixes into the upper triangular matrix from the upper-left corner local matrix according to a upper-left to lower-right sequence; and
the at least one CORDIC element transforms remaining diagonal local matrixes into the upper triangular matrix from the lower-right corner local matrix according to a lower-right to upper-left sequence.

8. The communication device to constrain power allocation as claimed in claim 7, wherein the at least one CORDIC element uses at least a CORDIC operation to implement the SVD operation and the generalized triangular decomposition.

9. The communication device to constrain power allocation as claimed in claim 8, wherein the at least one CORDIC element transforms respective diagonal local matrixes into an upper triangular matrix from the upper-left corner local matrix and the lower-right corner local matrix in parallel by using a vectoring mode of the CORDIC operation.

10. The communication device to constrain power allocation as claimed in claim 7, wherein the transforming of the remaining diagonal local matrixes are executed in parallel until the diagonal elements of the diagonal local matrix are transformed to the diagonal elements of the specific diagonal vector.

11. The communication device to constrain power allocation as claimed in claim 7, wherein a product of each of the absolute values of the diagonal elements of the specific diagonal vector is equal to a product of the absolute values of the diagonal elements of the diagonal matrix.

12. The communication device to constrain power allocation as claimed in claim 7, wherein each of the local matrixes is a 2×2 matrix.

\* \* \* \* \*